United States Patent [19]

Hewitt

[11] Patent Number: 5,764,099

[45] Date of Patent: Jun. 9, 1998

[54] INTEGRATED VOLTAGE REGULATING CIRCUIT USEFUL IN HIGH VOLTAGE ELECTRONIC ENCODERS

[75] Inventor: Kent Hewitt, Mesa, Ariz.

[73] Assignee: Microchip Technology, Inc., Chandler, Ariz.

[21] Appl. No.: 611,451

[22] Filed: Mar. 5, 1996

[51] Int. Cl.⁶ ........................................ G05F 1/00
[52] U.S. Cl. .................. 327/545; 327/544; 327/546; 327/530
[58] Field of Search ........................ 327/544, 545, 327/546, 530; 364/707

[56] References Cited

U.S. PATENT DOCUMENTS

| | | | |
|---|---|---|---|
| 3,755,806 | 8/1973 | Bunting | 364/707 |
| 4,381,552 | 4/1983 | Nocilini et al. | 364/707 |
| 4,455,623 | 6/1984 | Wesemeyer et al. | 364/707 |
| 4,463,646 | 8/1984 | Mitarai | 364/707 |
| 4,698,748 | 10/1987 | Juzswik et al. | 364/707 |
| 4,964,121 | 10/1990 | Moore | 370/311 |
| 5,051,936 | 9/1991 | Gleason, III et al. | 364/707 |
| 5,481,222 | 1/1996 | Utz | 327/544 |

*Primary Examiner*—Terry Cunningham
*Attorney, Agent, or Firm*—Bardehle, Pagenberg, Dost, Altenburg, Frohwitter, Geissler

[57] ABSTRACT

According to the present invention, there is provided an integrated circuit useful in an electronic encoding device having a voltage source, a user interface and a transmitter. In one embodiment the integrated circuit includes a wake-up circuit which generates a signal responsive to an input received from the user interface; power switching logic which provides power from the voltage source to a non-regulated power bus and a voltage regulating circuit, the power switching logic being responsive to the signal from the wake-up circuit; a regulated power bus in communication with the voltage regulating circuit; non-volatile memory in communication with the regulated power bus; encoder logic in communication with the regulated power bus, the encoder logic having output logic which provides a signal to the transmitter.

4 Claims, 2 Drawing Sheets

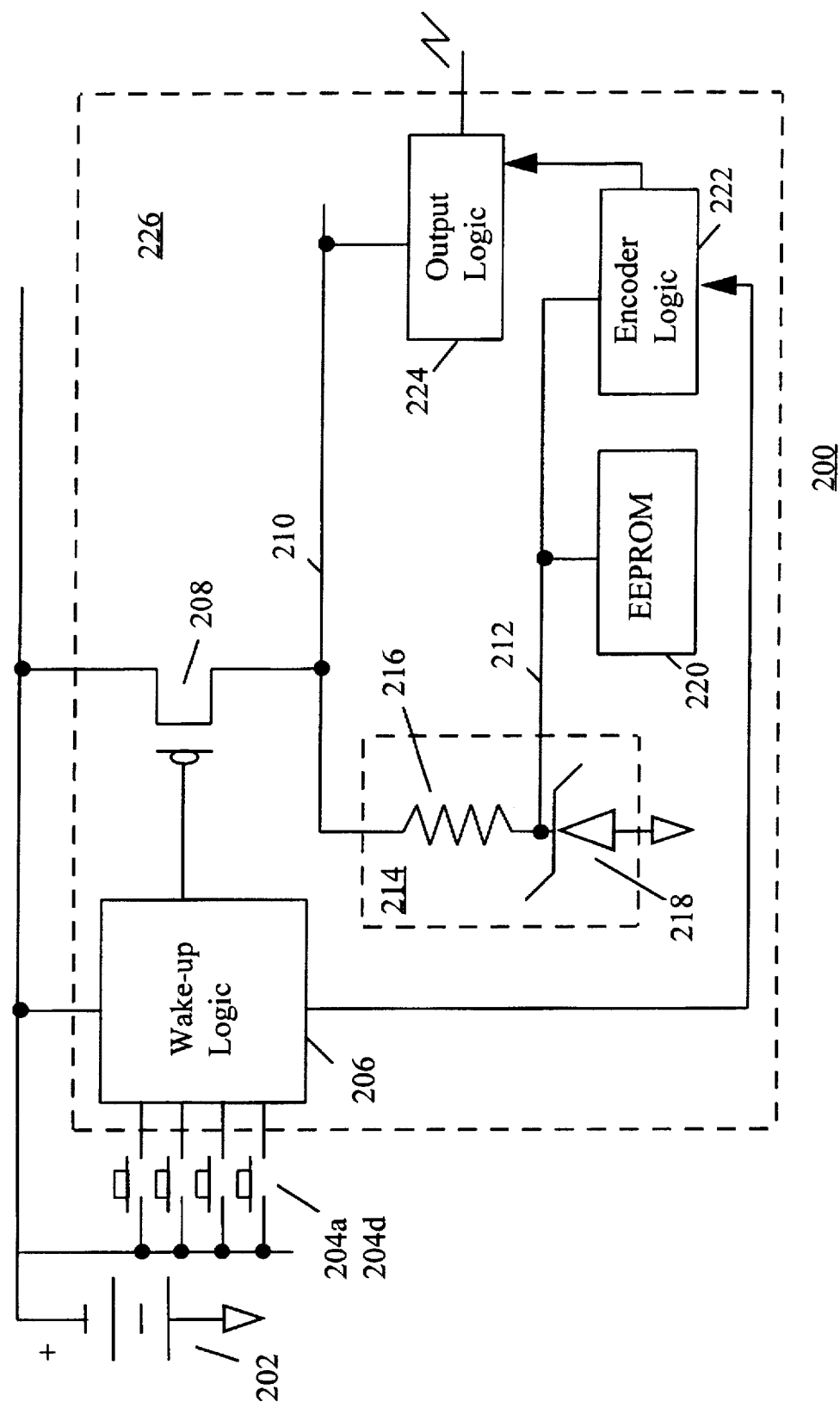

INTEGRATED VOLTAGE REGULATING CIRCUIT USEFUL IN HIGH VOLTAGE ELECTRONIC ENCODERS

BACKGROUND OF THE INVENTION

This invention relates generally to the field of electronic encoding and decoding, and more particularly to encoders and decoders useful for transmitting and receiving secure signals for remotely controlling systems. Still more particularly, the invention relates to the field of integrated power supplies useful in such encoders.

Controlling systems and devices by remote control is becoming increasingly popular in many applications. Examples of such applications are numerous; some of the most common include security systems for buildings, security systems for vehicles, and garage door and gate openers. These systems typically employ a transmitter to send an encoded signal to a receiver which decodes the signal and causes the desired operation to be performed. Normally, these transmitters are small, hand-held, battery-operated units which are easily transportable by the operator. FIG. 1 is a block diagram of a typical transmitter having a power supply 10, a user interface 12, encoding logic 14, and a transmitter 16. The power supply 16 is normally provided by batteries. The user interface 12 is typically a button, or a series of buttons, which provides signals to the encoder logic 14 causing it to generate certain signals to the transmitter 16. The transmitter 16 then transmits the signal provided by the encoder logic 14 to the remote receiver.

In an effort to reduce cost, it is desirable to fabricate as much of the encoder logic as possible into a single integrated device, or chip.

The transmitter 16 is typically a radio frequency transmitter. The effective transmission range of the transmitter 16 is related to the power supply voltage 10. Generally, the longer the transmission range, the better. A typical integrated circuit has a maximum supply voltage of 5.5 or 6 volts. However, in order to increase the range of the transmitter 16, higher voltage systems, for example 12 volts, are provided which generate a stronger RF signal and therefore allow a greater transmission range.

However, since these voltages are higher than the maximum allowable supply voltages for the integrated circuit encoders, it is necessary that a voltage regulator be added to the circuit board of the device to limit the voltage supply to the encoder chip. This requires additional circuitry, more space on the circuit board, and adds cost to the overall transmitter unit.

SUMMARY OF THE INVENTION

According to the present invention, there is provided an integrated circuit useful in an electronic encoding device having a voltage source, a user interface and a transmitter. In one embodiment the integrated circuit comprises a wake-up circuit which generates a signal responsive to an input received from the user interface; power switching logic which provides power from the voltage source to a non-regulated power bus and a voltage regulating circuit, the power switching logic being responsive to the signal from the wake-up circuit; a regulated power bus in communication with the voltage regulating circuit; non-volatile memory in communication with the regulated power bus; encoder logic in communication with the regulated power bus, the encoder logic having output logic which provides a signal to the transmitter. According to a further embodiment of the invention, the integrated circuit further comprises a resistor in series connection with a Zener diode.

BRIEF DESCRIPTION OF THE DRAWINGS

The present invention will be better understood in view of the following description with reference to the attached drawings, wherein:

FIG. 2 is a block diagram of an encoding device according to an embodiment of the invention.

DETAILED DESCRIPTION OF THE EMBODIMENTS OF THE INVENTION

Figure 1:
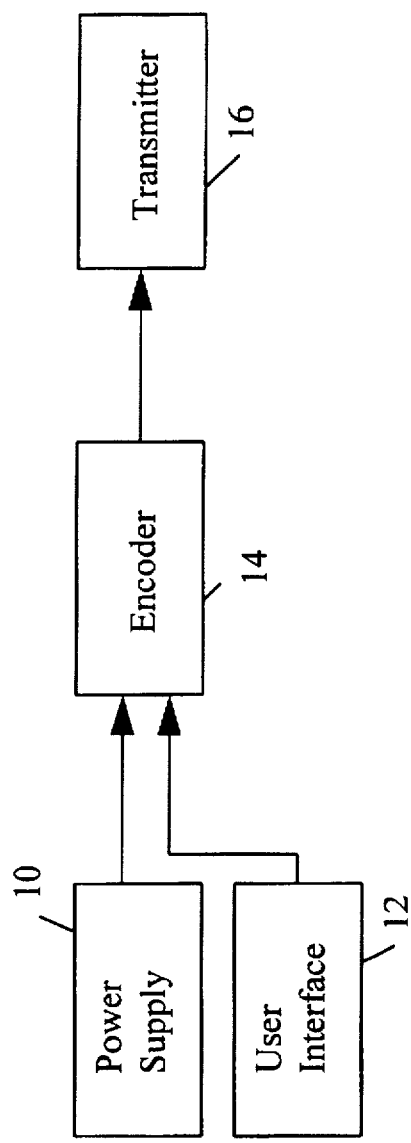
FIG. 1 is a block diagram of an encoding device.

Referring now to FIG. 2, there is shown a block diagram of an encoding device 200 according to an embodiment of the invention. In this embodiment, the encoding device 200 comprises a power supply 202, a user interface comprising input buttons 204a–204d, a radio frequency transmitter (not shown), an integrated circuit 226 which performs the necessary processing to generate data to be transmitted to a remote receiving unit.

In one embodiment, power supply 202 is a high voltage supply which supplies voltage to the integrated circuit 226 at wake-up logic 206. Integrated circuit 226 comprises wake-up logic 206, power switching logic 208, non-regulated power bus 210, voltage regulating circuit 214, regulated power bus 212, output logic 224, non-volatile memory 220, and encoder logic 222. In this embodiment, integrated circuit 226 allows for the following operation.

When a button 204a–204d is pressed by a user, a signal is provided from power supply 202 to wake-up logic 206. Wake-up logic 206 is designed to withstand the high voltage supplied by power supply 202. Upon sensing an input from a user, wake-up logic 206 provides a signal to power switching logic 208. Power switching logic 208 provides the high voltage from power source 202 to non-regulated power bus 210 in response to receiving the signal from wake-up logic 206. In the embodiment shown, power switching logic 208 is a power PMOS switch. The signal from wake-up logic 206 is applied to the gate of PMOS switch 208 to turn transistor 208 on. This is a low cost, simple to manufacture power switching logic requiring only a single PMOS transistor. However, other suitable circuits will occur to those with skill in the art.

When PMOS transistor 208 is turned on by wake-up logic 206, high voltage from voltage source 202 is applied to the non-regulated power bus 210. Of course, it is understood that the voltage on power bus 210 would destroy the transistors used in non-volatile memory 220 and encoder logic 222. Therefore, the voltage on bus 210 is applied to voltage regulator circuit 214 which reduces the voltage to an acceptable level, for example, 6 volts, and provides the reduced voltage to regulated power bus 212. The lower, regulated voltage 212 is then applied to non-volatile memory 220, in this case, EEPROM, and encoder logic 222. Encoder logic 222 then receives a signal from wake-up logic 206 related to the input provided by the user. This embodiment, depending on which of buttons 204a–204d is pressed, then the encoder logic 222 retrieves the corresponding data from EEPROM memory, encodes the data, then provides it to output logic 224.

The type of encoder logic 222 used is not critical to the present invention, and suitable encoder logic circuits are known to those with skill in the art, depending on the particular design requirements. For example, in one embodiment the encoder may be a simple fixed code encoder. In alternate embodiments, the encoder logic 222 is code-hopping encoder logic which provides greater security.

Examples of useful encoder logic circuits are provided in U.S. Pat. Nos. 5,055,071, 4,928,098, 4,835,047, and 4,847,641, all of which are incorporated herein by reference.

Output logic 224 serves primarily as a buffer between the encoded data provided by encoder logic 222 and the radio frequency transmitter (not shown). Output logic 224 is designed to withstand the high voltages present on unregulated power bus 210, and therefore, it serves to provide electrical isolation between the high voltage radio frequency transmitter and encoder logic 222.

Voltage regulator 214 is integrated on chip 226, rather than being provided "off chip" as a separate component. This enables the encoding device 200 to be manufactured at a lower cost than pre-existing devices which use off-chip voltage regulators because integrating the voltage regulator circuit 214 lowers the component cost of the device 200. Moreover, according to the present invention, since an off-chip voltage regulating part is not required, the circuit board for the encoding device 200 may be made smaller, thereby reducing the size requirements of the device 200.

In the embodiment shown, the voltage regulating circuit 214 comprises a resistor 216 in series connection with a Zener diode 218. In one specific embodiment, resistor 216 has a value of 1,000 ohms and the Zener diode 218 is a 5 volt Zener diode. This embodiment is particularly useful because it is easy to manufacture, low cost, and requires only a small number of components. However, it will be appreciated that a wide variety of voltage regulators could be used which would also provide suitable results. Moreover, the design of the voltage regulator 214 will depend to some degree on the type of technology used by integrated circuit 226. For example, not all integrated circuit technologies support the creation of Zener diodes. Therefore, other voltage regulating circuits, such as voltage dividing networks, will be useful with these technologies.

What is claimed is:

1. An integrated circuit useful in an electronic encoding device having a high voltage source, a user interface and a transmitter operable with the high voltage source to generate a radio frequency transmission, the integrated circuit comprising:

a wake-up circuit which generates a signal responsive to an input received from the user interface;

power switching logic responsive to the signal from the wake-up circuit, which provides high voltage to the transmitter and to a voltage regulating circuit;

wherein the voltage regulating circuit reduces the high voltage to provide a low voltage to a non-volatile memory and encoder logic, the encoder logic having output logic which provides data to the transmitter.

2. An integrated circuit as in claim 1 wherein the voltage regulating circuit comprises a resistor in series connection with a Zener diode.

3. An electronic encoding device as in claim 1 wherein the maximum voltage level of the high voltage power source is about 12 volts.

4. An electronic encoding device as in claim 1 wherein the voltage regulating circuit provides a low voltage having a maximum voltage of between about 5.5 and 6 volts.

* * * * *